United States Patent [19]
Collins et al.

[11] Patent Number: 5,287,956
[45] Date of Patent: Feb. 22, 1994

[54] HIGH SPEED CONVEYOR WITH MOVABLE DRIVE WHEEL

[75] Inventors: Ellsworth H. Collins, Mt. Washington; James F. Mattingly; Willliam A. Fultz, both of Louisville, all of Ky.

[73] Assignee: The Interlake Companies, Inc., Shepherdsville, Ky.

[21] Appl. No.: 14,378

[22] Filed: Feb. 5, 1993

[51] Int. Cl.$^5$ .............................................. B65G 13/06
[52] U.S. Cl. ...................................... 198/781; 198/791
[58] Field of Search ............................... 198/781, 791

[56] References Cited

U.S. PATENT DOCUMENTS

| | | | |
|---|---|---|---|
| 3,225,893 | 10/1962 | Currie . | |
| 3,612,248 | 10/1971 | Wallis . | |
| 3,718,248 | 2/1973 | Muller . | |
| 3,768,630 | 10/1973 | Inwood et al. . | |
| 4,103,769 | 8/1978 | Jorgensen | 198/781 |
| 4,109,783 | 8/1978 | Vogt | 198/781 |
| 4,193,492 | 3/1980 | Hammond | 198/781 |
| 4,344,527 | 8/1982 | Vogt et al. | 198/781 |
| 4,473,149 | 9/1984 | Vogt et al. | 198/781 |
| 4,753,339 | 6/1988 | Vogt et al. | 198/781 |
| 4,815,588 | 3/1989 | Katsuragi et al. | 198/781 |
| 5,038,922 | 8/1991 | Collins et al. | 198/781 |

*Primary Examiner*—Cheryl L. Gastineau
*Attorney, Agent, or Firm*—Theresa F. Camoriano

[57] ABSTRACT

A conveyor has a drive wheel which is driven from a driveshaft and which moves into and out of driving engagement. In the preferred embodiment, there is a drive gear mounted on the drive shaft, and the drive gear drives a drive wheel, which is mounted on a drive wheel mounting frame that pivots about the axis of the drive shaft, so that the drive wheel is constantly driven from the driveshaft and pivots into and out of driving engagement with the conveyor roller.

21 Claims, 7 Drawing Sheets

HIGH SPEED CONVEYOR WITH MOVABLE DRIVE WHEEL

BACKGROUND OF THE INVENTION

The present invention relates to conveyors driven by a drive shaft extending along the conveyor.

The primary type of driveshaft-driven conveyor used in the industry uses O-rings, which wrap around spools mounted on the drive shaft and around the conveyor rollers in order to drive the rollers as the drive shaft rotates. This type of conveyor has a speed limitation, because the O-rings may begin to slip at high speeds. It also is difficult to replace the O-rings when they break. It is also very difficult to stop portions of the O-ring driven conveyor for accumulation.

Some conveyors are known which use a drive shaft and drive by a means other than O-rings. For example, it is known to put a gear on the driveshaft and a gear on the conveyor roller and have a direct drive from the driveshaft to the roller. This arrangement cannot be put into the accumulation mode, because, whenever the driveshaft is rotating, all the conveyor rollers are rotating.

Chain-driven roller conveyors are known, but they also have speed limitations, can be very noisy, and require substantial maintenance. Chain-driven conveyors are not readily reversible in direction, because a chain must always be pulled, not pushed.

SUMMARY OF THE INVENTION

The present invention provides a conveyor with all the advantages of a driveshaft-driven conveyor, such as quiet operation, plus it can readily be put into an accumulation mode, in which portions of the conveyor can be stopped and started for accumulating products on the conveyor, and it has far fewer maintenance problems than standard O-ring, lineshaft conveyors and far fewer maintenance problems than chain-driven conveyors.

The present invention provides a much higher conveying speed than other accumulating conveyors, with a maximum speed of about 500 feet per minute, as compared with 250 feet per minute for other known accumulating conveyors.

The present invention provides a simple, inexpensive conveyor design, which is easy to assemble and to maintain.

The present invention provides a conveyor which is reversible in two ways. It can be driven forward and backward simply by reversing the direction of rotation of the driveshaft. It also can be installed on the left or right side of the conveyor without changing any of the components.

The present invention provides a positive drive and eliminates the problems of replacing O-rings and the noise and maintenance problems of chain drives.

The present invention provides an arrangement in which the drive shaft and drive mechanism can be assembled onto one siderail and can be stocked in that manner to be used as standard, off-the-shelf stock for any width of conveyor. This stocked length of siderail and drive can then be combined with a second standard siderail and with cross-members of any width to make any width of conveyor. This greatly simplifies assembly and stocking requirements from other known conveyors.

DESCRIPTION OF THE PREFERRED EMBODIMENTS

Figure 1:
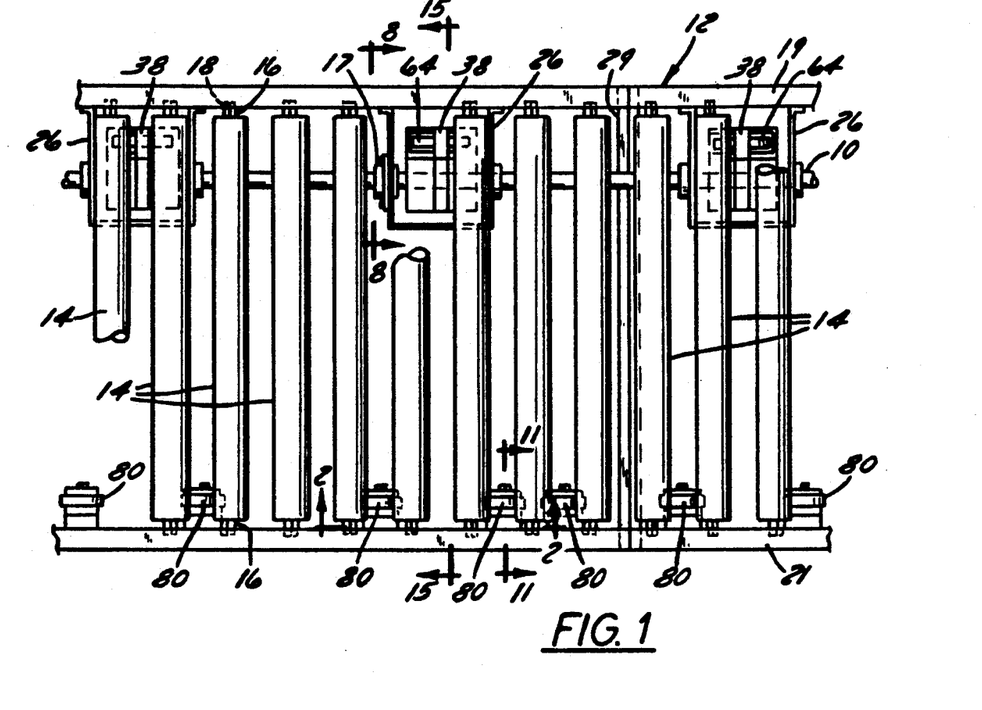
FIG. 1 is a schematic plan view of a conveyor made in accordance with the present invention.

As shown in FIG. 1, the driveshaft 10 extends along the length of the conveyor frame 12. The driveshaft 10 is driven by a motor (not shown), and the direction of rotation of the driveshaft can be reversed simply by changing the side of the motor to which the negative electrical lead is attached, which will control the direction in which the conveyor transports articles.

Conveyor rollers 14 are mounted on the conveyor frame 12. Each roller 14 has hexagonally-shaped shaft ends 16 which mount into hexagonally-shaped holes 18 on the left and right siderails 19, 21 of the conveyor frame 12, and the body of the roller 14 is freely rotatable relative to the shaft ends.

At intervals along the left siderail 19 are mounted drive gear support boxes 26. Each drive gear support box 26 houses a drive gear 20, which is mounted on the driveshaft 10. In FIG. 1, three of the support boxes 26 are shown. It is anticipated that there will be one drive gear 20 for every 30 inches of conveyor length. The drive gear 20 and the rest of the drive mechanism are shown in more detail in FIGS. 3–10. Looking now at FIG. 5, it can be seen that, on the front side of each drive gear 20 are radially-extending, backwardly-tapered teeth 22, and, molded to the inside of each drive gear 20 is a non-cylindrical core 24 (shown in FIG. 5), which mates with the non-cylindrical outside surface of the pinion adapter 23 and which provides a good wear surface on the bad,, side of the drive gear 20 for contacting the housing thrust washer 68. The pinion adapter 23 is fixed to the drive shaft 10 by means of set screws (not shown).

Figures 5, 6:
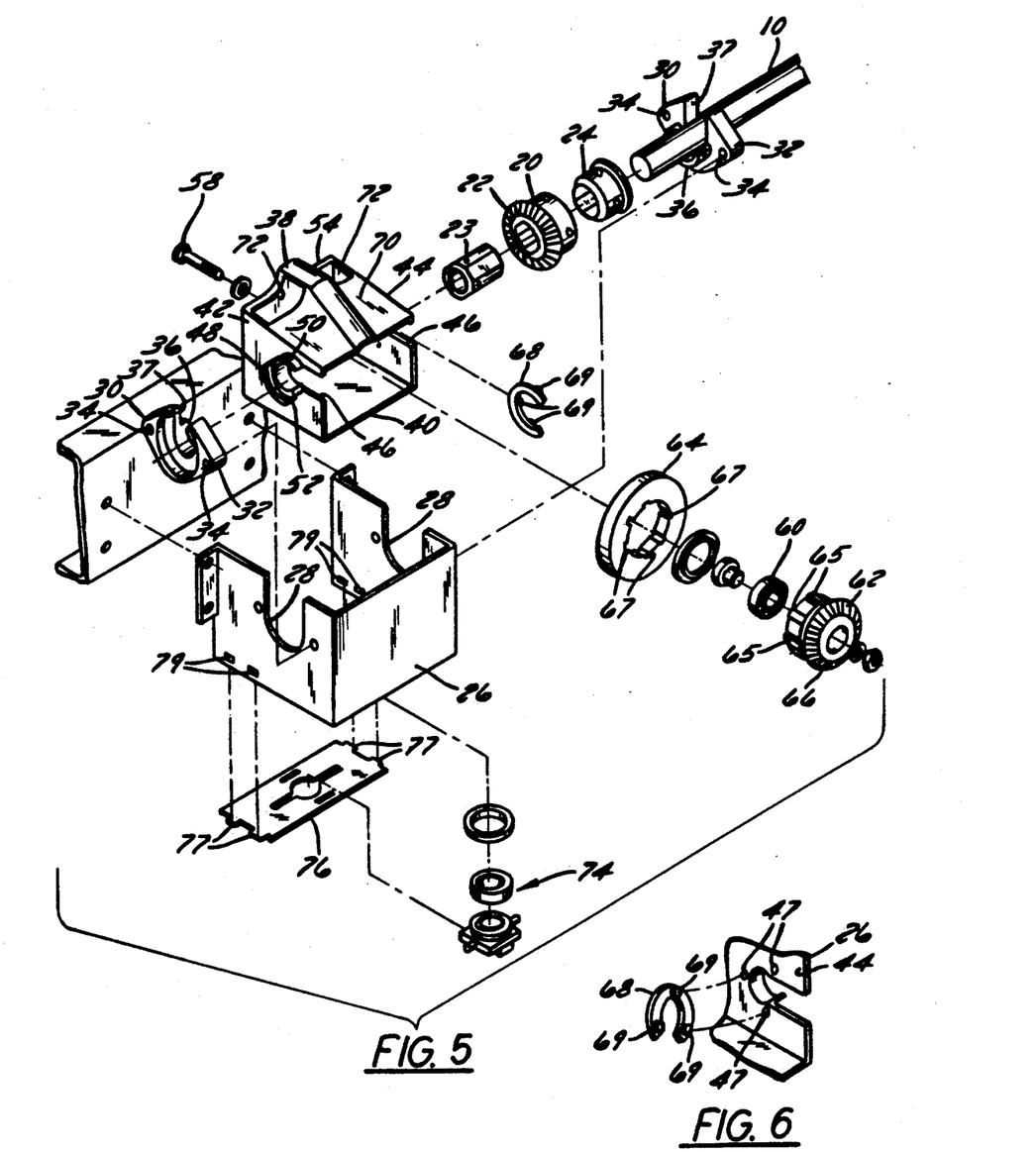
FIG. 5 is an exploded perspective view of one of the drive portions shown in FIG. 1.
FIG. 6 is a broken-away exploded perspective view of the portion of the driven gear housing of FIG. 5 which receives the thrust washer.

It will be understood that the drive gear 20 can float axially relative to the driveshaft 10 by sliding axially along the pinion adapter 23 but that the drive gear 20 is driven whenever the driveshaft is driven. The driveshaft 10 drives the drive gear 20 by driving the pinion adapter 23, which is fixed to the drive shaft 10, and which mates with the non-cylindrical inner surface of the drive gear 20, thereby driving the drive gear 20.

Figure 7:
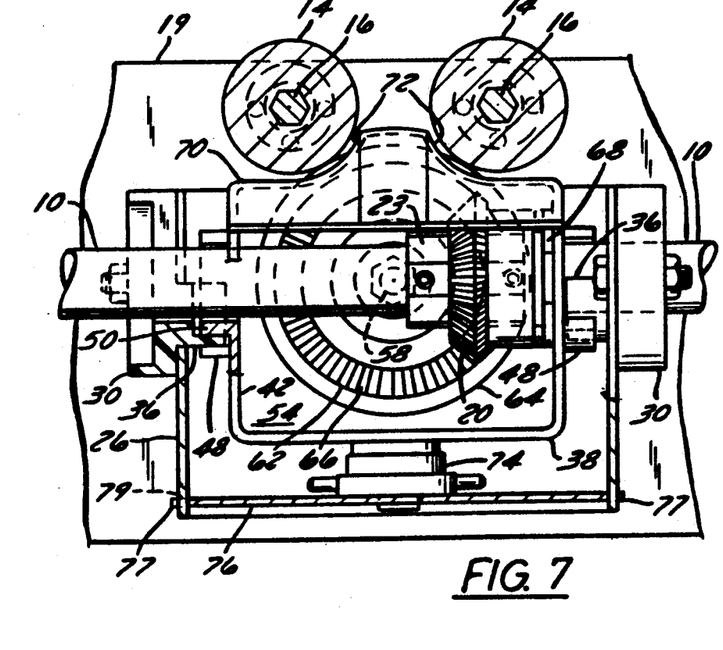
FIG. 7 is a right side sectional view of one of the drive portions shown in FIG. 1.
Figure 10:
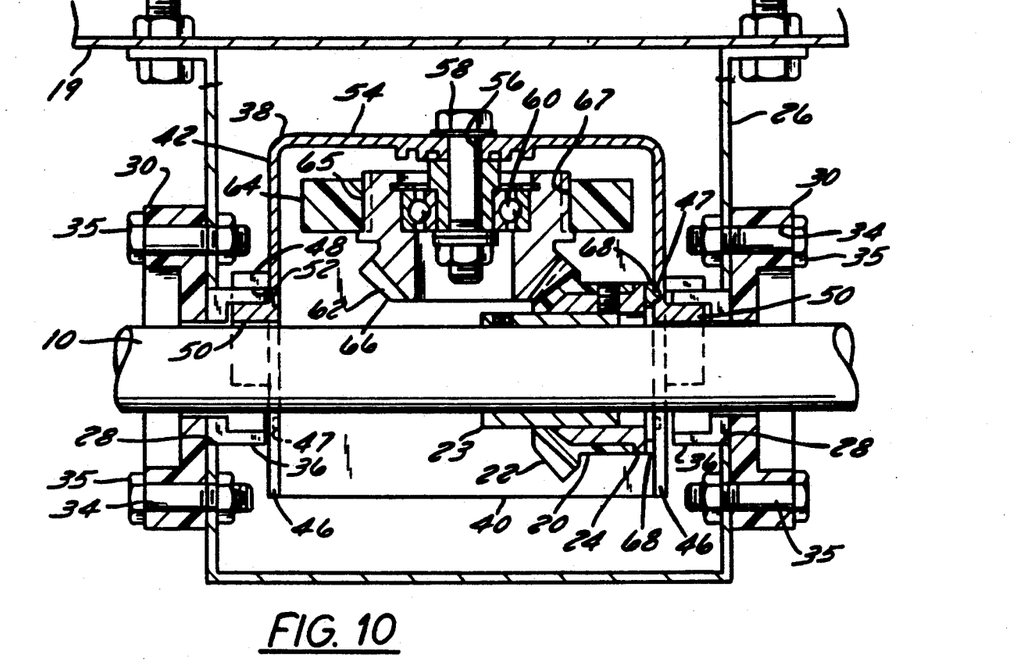
FIG. 10 is a top sectional view of one of the drive portions of FIG. 1.
Figure 11:
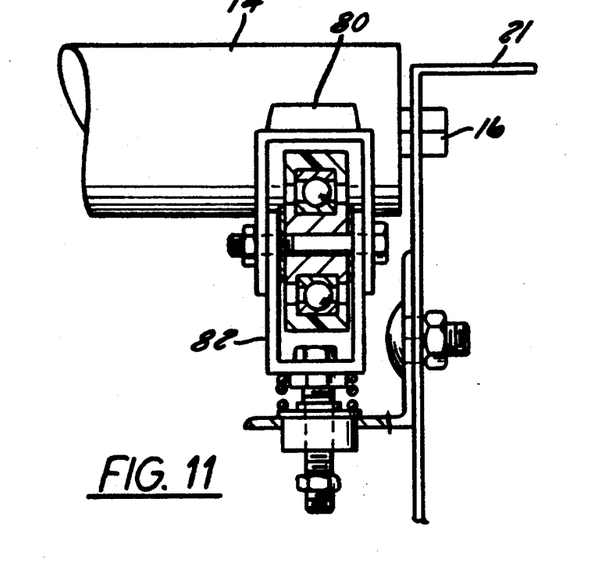
FIG. 11 is a front sectional view of one of the jump rollers taken through the section 11—11 of FIG. 1.

The support bracket or box 26 has an open top and upwardly-opening U-shaped cut-outs 28 in its front and back faces to permit the driveshaft 10 to extend through the support box 26 without contacting the support box 26. When the drive gear 20 is mounted over the driveshaft 10 and the support box 26 is mounted on the siderail, the drive gear 20 lies inside its respective support box 26, as can be seen in FIGS. 7 and 10.

Referring again to FIG. 5, housing supports 30 are located at each of the U-shaped cut-outs 28 of the box 26. The housing supports 30 have ears 32 with holes 34 for fastening the housing supports 30 to the support box 26 by means of bolts 35 (the bolts 35 are shown best in FIG. 10). Each housing support 30 also has a projection 36 on one side, which is shaped as a portion of a cylinder, covering approximately 180 degrees, which projects through its respective U-shaped cut-out in the support box 26 when the housing support 30 mounted on the box 26. The inside diameter of the projection 36 is larger than the diameter of the driveshaft 10, so the driveshaft 10 passes through the projections 36 of the housing supports 30 with a clearance fit. The wall thickness of the projection 36 is preferably about 5/32 of an inch. Each housing support 30 also defines an upwardly-opening U-shaped cut-out 37, which permits the driveshaft 10 to be dropped down into the box 26 from the top and to extend through the housing supports 30 with a clearance fit.

Inside the support bracket or box 26 is mounted a housing 38, which is pivotably supported by the housing supports 30 of the box 26. The housing 38 has an open side 40, and the forward and rear faces 42, 44 of the housing 38 have horizontally-oriented U-shaped cut-outs 46, which open into the open side 40. These U-shaped cut-outs 46 are also large enough that the driveshaft 10 passes through them with a clearance fit.

At each of the U-shaped cut-outs 46 of the housing 38 is a pair of outwardly-projecting partial cylinders 48, 50, with a gap 52 defined between the partial cylinders 48, 50 for receiving the respective projection 36 of the housing support 30. These outwardly-projecting partial cylinders 48, 50 are preferably molded as an integral part of the housing 38. As shown best in FIG. 4, the inner partial cylinder 50 extends about 270 degrees, and the outer partial cylinder 48 extends about 90 degrees.

Figure 4:
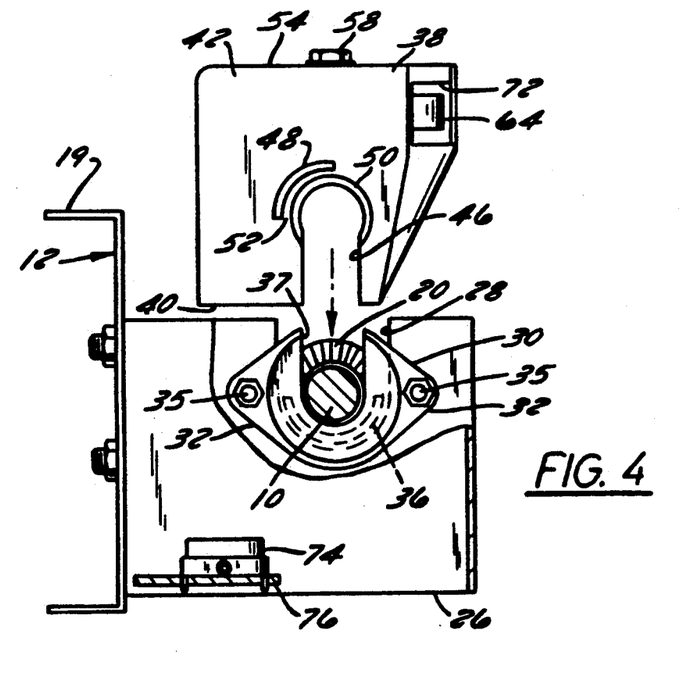
FIG. 4 is a broken-away front sectional view of one of the drive portions of FIG. 1.

FIG. 4 shows how the housing 38 is mounted onto the support box 26. First the housing 33 is rotated 90 degrees, until the open side 40 faces downwardly as shown in FIG. 4. Then, the housing 38 is shifted downward until the driveshaft 10 enters the U-shaped cut-outs 46 in the housing 38. Then, the housing is rotated 90 degrees back to its normal position, with the cylindrical projection 36 of each of the housing supports 30 entering the space or gap 52 between the respective partial cylinders 48, 50 on the end of the housing 38. This locks the housing 38 in place so that it can shift axially a small distance inside the support box 26, moving with the drive gear 20, and it can rotate relative to the driveshaft 10, but it cannot rove vertically or shift left or right relative to the driveshaft.

The wall 54 of the housing 38 which lies opposite the open face 40 defines a central hole 56, which receives a mounting bolt 58. On the mounting bolt 58 is mounted a bearing 60. A driven gear 62 is mounted on the bearing 60. On the forward face of the driven gear 62 are radially-extending, rearwardly-tapered teeth 66, which mesh with the teeth 22 of the drive gear 20. From the moment the housing 38 is mounted on the support box 26, the drive gear 20 and the driven gear 62 are meshed, and they remain meshed as long as the housing 38 is installed on the support box or bracket 26.

A drive wheel or tire 64 is mounted on the back of the driven gear 62, with a non-cylindrical mating connection between the driven gear 62 and the drive tire 64. As shown in FIG. 5, the back portion of the driven gear 62 has a plurality of ridges 65 in its outer surface, and the inner surface of the drive tire 64 has corresponding indentations 67, which mate with the ridges 65.

Figure 2:
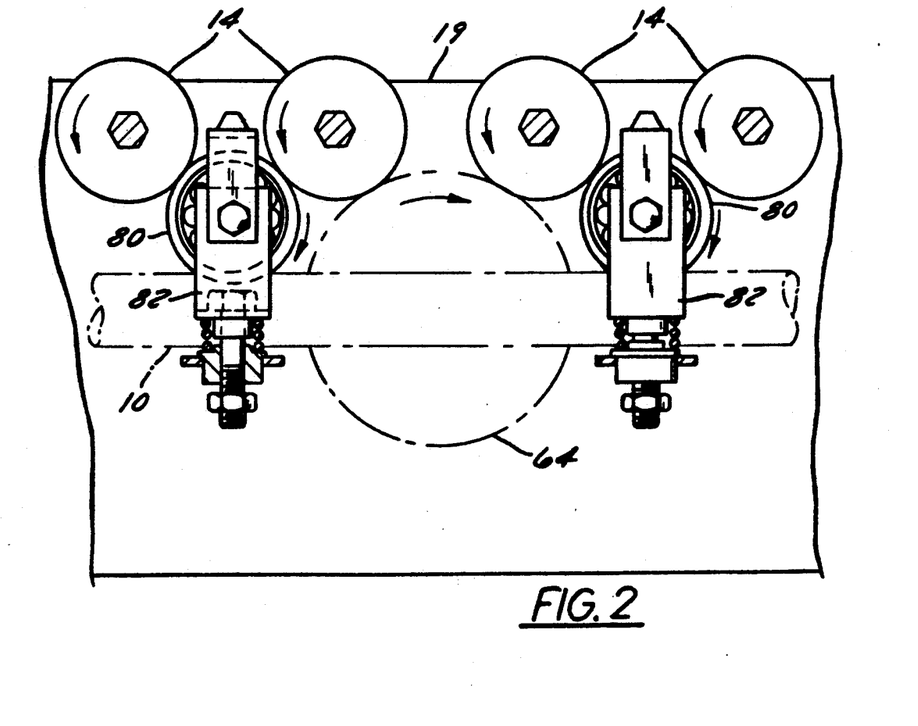
FIG. 2 is a schematic right side sectional view of the conveyor as shown through the section 2—2 of FIG. 1.
Figure 3:
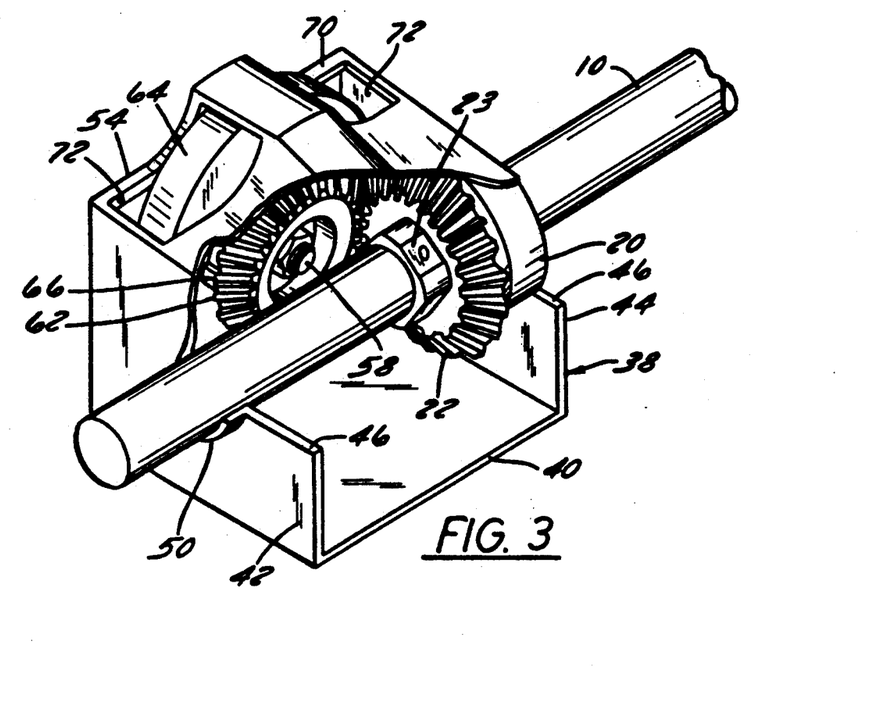
FIG. 3 is a broken-away perspective view partially in section of one of the drive portions of the conveyor shown in FIG. 1.

A housing thrust washer 68 has projecting feet 69, which snap through holes 47 on the inside of the housing 38 at the U-shaped cut-out 46 on the back face 44 of the housing 38 as shown in FIG. 6. The thrust washer 68 could be snapped into holes 47 in the front face 42 of the housing 38 instead, if the drive gear 20 were to be mounted in the opposite direction. The thrust washer 68 provides a wear surface against which the rear of the core 24 of the drive gear 20 can push. The top surface 70 of the housing 38 defines openings 72 which permit the drive tire 64 to project through the top surface 70 in order to contact and drive two adjacent rollers 14. FIG. 2 shows the drive tire 64 in broken lines as it drives two adjacent rollers 14. FIG. 7 shows the drive tire 64 projecting through the cut-outs 72 in the housing 38 to drive the two adjacent rollers 14.

An air-operated diaphragm 74 snaps onto a flat support bracket 76, which mounts to the box 26 by means of legs 77 that extend through slots 79 in the box 26 (shown best in FIG. 5). The purpose of the diaphragm 74 is to move the drive wheel 64 up and down to engage and disengage it from driving the rollers 14.

Figure 8:
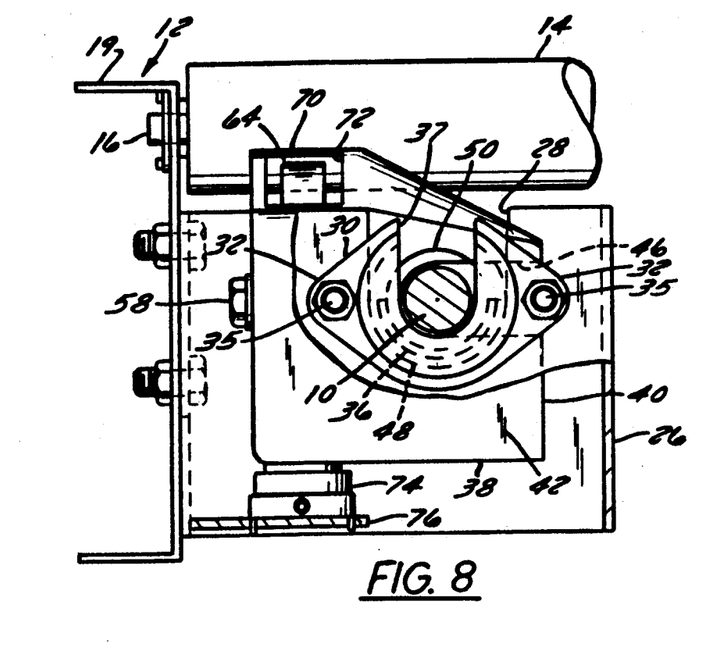
FIG. 8 is a front view partially in section of the drive portion as seen through the section 8—8 of FIG. 1 when the drive wheel housing is in the driving position.
Figure 9:
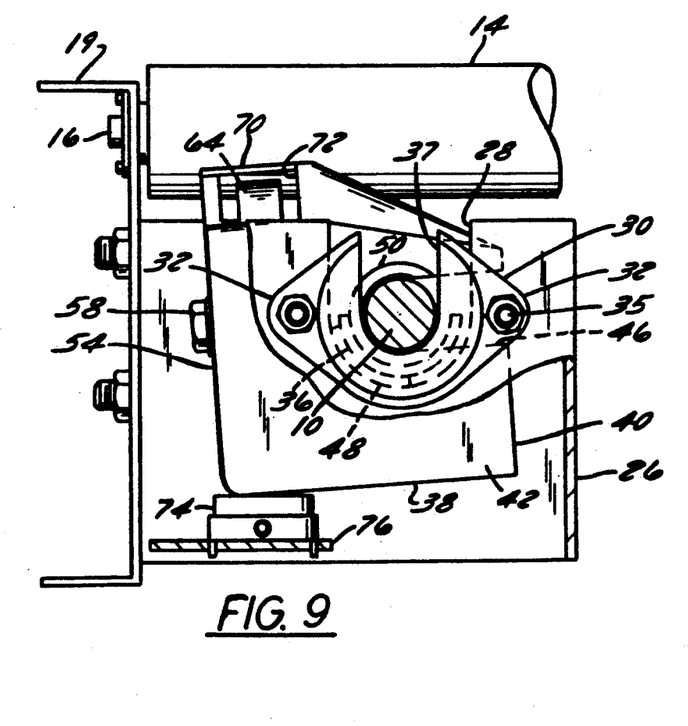
FIG. 9 is the same view as FIG. 7 except that the drive wheel housing is in the retracted, non-driving position.

FIGS. 8 and 9 show the two positions the housing 38 takes, depending upon whether the diaphragm 74 is filled with air or not. When air enters the diaphragm 74, it pushes the diaphragm 74 upwardly, and the diaphragm pushes the left bottom portion of the housing 38 upwardly, pivoting the housing clockwise, and moving the drive wheel 64 into driving contact with its respective rollers 14 as shown in FIG. 8. When air is exhausted from the diaphragm 74, the weight of the drive wheel support frame 38 causes it to pivot back down, moving the drive wheel 64 of driving contact with the rollers 14 as shown in FIG. 9. These drawings are exaggerated to show the pivoting motion. Actually, the drive tire 64 only has to move slightly (about ⅛ of an inch) to engage and disengage the rollers 14.

As shown in FIGS. 1, 2, 11, and 15 on the right side rail 21, opposite the rail 19 on which the drive mechanisms are mounted, are a plurality of jump wheels 80. Each jump wheel 80 is mounted so as to contact two adjacent rollers 14, and the function of each jump wheel 80 is to transmit power from one roller to the other. Each jump wheel 80 is mounted in a spring-loaded bracket 82, which pushes the jump wheel 80 upward into contact with the two adjacent rollers 14 while giving the jump wheel enough play to find the center between the adjacent rollers 14.

Thus, as each drive tire 64 drives two adjacent rollers 14, those rollers 14 drive their respective jump wheels 80, which, in turn, drive other rollers 14, so that, for a normal conveyor, is each drive tire 64 will end up driving five rollers 14 (i.e. three jump wheels 80 for every drive wheel 64). The number of rollers to be driven by each drive mechanism will depend upon the weight of the articles to be carried, with fewer jump wheels being used in a conveyor intended to convey very heavy articles.

Assembly of the conveyor is as follows:

The diaphragm 74 is mounted on the diaphragm support bracket 76, which, in turn, is mounted on the main support bracket 26 by extending the legs 77 through the openings 79. The support bracket or support box 26 is bolted to the siderail 19 of the conveyor frame 12, and the housing supports 30 are bolted to the support bracket 26. The drive gears 20 (with their non-cylindrical cores 24) and the pinion adapters 23 are slipped over the drive shaft 10. The pinion adapters 23 are fixed to the driveshaft by means of set screws. The drive gears 20 are slipped over their respective pinion adapters 23 and can slide axially relative to the pinion adapters 23 while still being mounted on the pinion adapters. (When the driveshaft rotates, the pinion adapters rotate, causing the drive gears 20 to rotate.)

The drive shaft is then dropped through the open top of the support bracket 26 into the U-shaped cut-outs 37 in the housing supports 36, with each drive gear 20 located inside its respective support bracket 26.

The drive shaft 10 is mounted to the siderail 19 by means of bearings 17 which are bolted to every other support box 26. (The bearing 17 can be seen in FIG. 1.) The drive shaft 10 is mounted so that there is clearance between the driveshaft 10 and the support box 26.

Next, the housing 38 is assembled and installed. The driven gears 62 and drive tires 64 are assembled together and mounted on their respective bearings 60 and in their respective housings 38 by means of bolts 58. The housings 38 are then rotated 90 degrees, are dropped down over the drive shaft 10, meshing the driven gear 62 with the drive gear 20, and the housings 38 are then rotated back 90 degrees so that they are supported on the projections 36 of the housing supports 30. Each housing 38 can now pivot about the axis of the driveshaft 10 by pivoting on the projections 36 on the housing supports 30, which are coaxial with the driveshaft. The drive wheel frame (or housing) 38 rests on the diaphragm 74 at the bottom of the support box 26. Again, there is clearance between the driveshaft 10 and the housings 38. The axis of the drive wheel 64 is substantially parallel to the axes of the conveyor rollers 14 and substantially perpendicular to the axis of the driveshaft 10.

The purpose of this unusual mounting arrangement, with the support box 26 mounted to the siderail and the housing 38 suspended from the support box 26, is to avoid the problem of having these elements mounted directly to the driveshaft 10, in which case those parts would require high speed bearings to handle their contact with the driveshaft 10. This arrangement provides a clearance fit between the driveshaft and those parts, so no such bearings are required.

In a ten-foot section of siderail 19, there should be four evenly-spaced support boxes 26 with their respective housings and gears. The preassembled ten-foot section of siderail 19, driveshaft 10, support box 26 and housing 38 may be stored in a warehouse as a stock item.

The drive mechanism is thus completely assembled in the section of left siderail 19. To put together the rest of the conveyor 10, the jump wheels 80 are mounted on the right siderail 21, a cross-member 29 is bolted between the left and right siderails 19, 21, defining the width of the conveyor, and the rollers 14 are mounted across the conveyor frame 12 by retracting one of the shaft ends 16 of each roller and placing the shaft ends 16 into the hexagonal holes 18 in the siderails 19, 21.

Sections of the conveyor frame 12 are then bolted together, and sections of driveshaft 10 are connected together with known connectors (not shown). The drive motor (not shown) is attached to the driveshaft, and the conveyor is ready for operation.

The air hoses, valves, and logic for controlling the diaphragms 74 are not shown, but they are standard, as used in known accumulation conveyors.

Operation of the conveyor is as follows:

Whenever the drive motor (not shown) is operating, it causes the driveshaft 10 to rotate, which causes all the drive gears 20 mounted on the driveshaft 10 to rotate. The driven gears 62 are constantly meshed with the drive gears 20, which eliminates any problem with meshing and unmeshing gears, and which means that, whenever the driveshaft 10 rotates, the driven gears 62 rotate.

Because of the connection between the driven gears 62 and their respective drive wheels 64, the driven gears 62 cause the drive wheels 64 to rotate. Thus, whenever the driveshaft 10 rotates, the drive wheels 64 rotate.

The force between the drive gear 20 and the driven gear 62 causes the driven gear to be pushed backward, to be stopped by the back surface of the core 24 of the drive gear 20 pushing against the housing thrust washer 68 mounted on the rear face 44 of the housing 38. The ability of the drive gear 20 to float axially permits the housing 38 to float with the drive gear 20, so that the drive wheel 64 can seek the center between the two rollers 14 it is driving. This ability to seek the center provides latitude in the manufacturing tolerances of the conveyor. It is also possible to fix the drive gear 20 to the driveshaft 10 so that it does not float axially along the driveshaft, by tightening a set screw in the drive gear 20 (not shown), if desired.

The drive wheel mounting frame 38 rests on the diaphragm 74, and the drive wheel 64 lies under two adjacent rollers 14. When the diaphragm 74 is inflated, it pivots the drive wheel support frame 38 upwardly, so that the drive wheel 64 contacts and drives its two rollers 14. When air pressure is exhausted from the diaphragm 74, the drive wheel 64 pivots downward, out of driving contact with the conveyor rollers 14, so the rollers 14 stop rotating and can be used to accumulate product.

Maintenance of this conveyor is very simple. In general, there is very little maintenance. The parts which are most likely to wear are the housing thrust washer 68 and the driven gear 62, which can be replaced by popping out two rollers 14, rotating the drive wheel support frame 38 and lifting it out of the conveyor, removing the worn parts, and replacing them. A spare assembled housing 38 may be kept on hand so that it can be quickly dropped into place to keep conveyor down time to a minimum.

Figure 14:
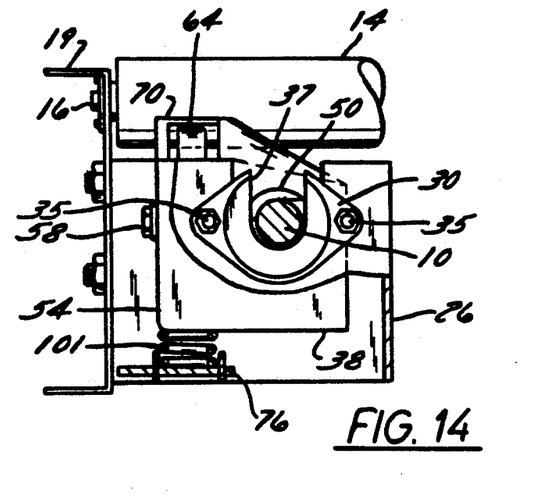
FIG. 14 is the same view as FIG. 8, except that a spring is being used instead of the diaphragm to keep the drive wheel in the driving position.
Figure 15:
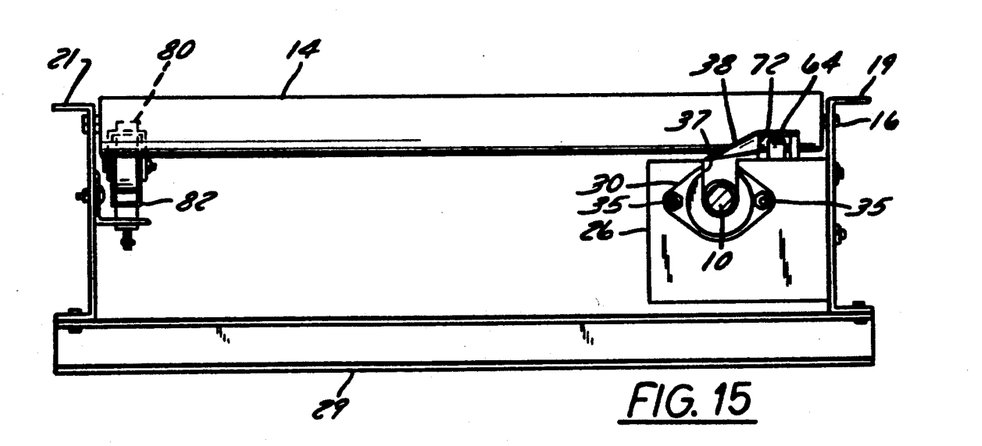
FIG. 15 is a rear sectional view of the conveyor of FIG. 1 taken through the section 15—15 of FIG. 1.

An alternate embodiment of the conveyor could be made by installing springs in the place of the diaphragms 74. This type of installation is shown in FIG. 14. In this arrangement, the spring 101 keeps the drive wheel housing 38 in the raised, driving position at all times. This installation could be made if the customer does not want to use the conveyor for accumulation at the outset but wants the option of converting to accumulation at a later time. The springs 101 are installed on the diaphragm support bracket 76 in order to keep the drive wheel 64 in contact with its rollers 14 at all times. In this arrangement, the rollers 14 rotate whenever the driveshaft 10 rotates, and sections of the conveyor cannot be stopped without stopping the entire conveyor. However, this continues to be a simple, easily-maintained conveyor, and it can be converted to an accumulation conveyor at any time, simply by adding the diaphragms 74, an air compressor, and air hoses running to the diaphragms 74.

Figure 12:
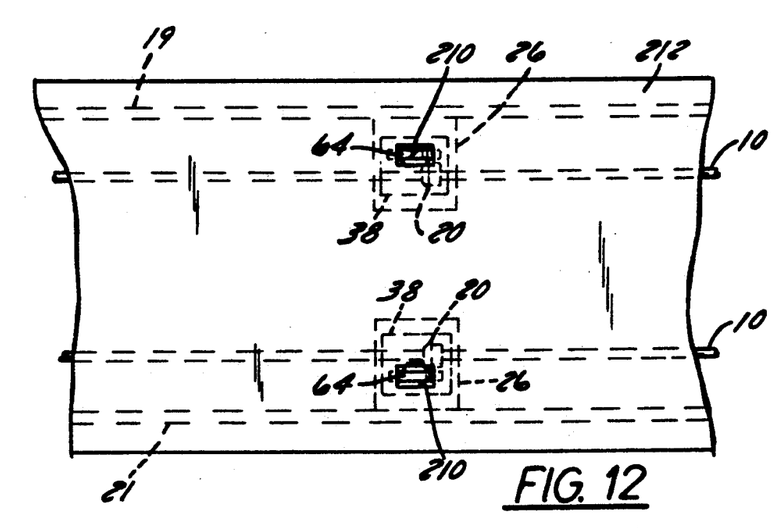
FIG. 12 is a schematic plan view of a second embodiment of the invention.
Figure 13:
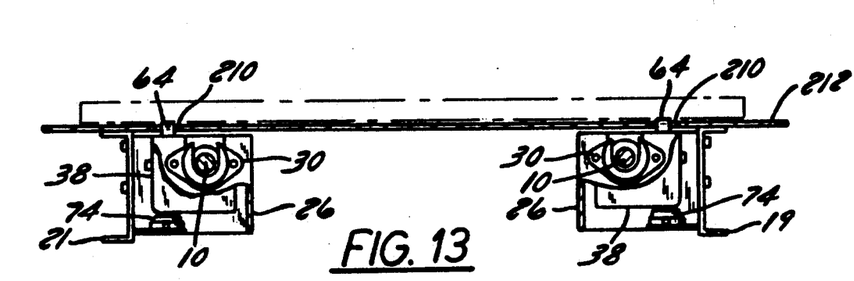
FIG. 13 is a schematic front sectional view of the embodiment shown in FIG. 12.

A second alternative embodiment, shown in FIGS. 12 and 13, eliminates the conveyor rollers entirely and uses the drive wheels 64 to convey the products. In this case, two parallel driveshafts 10 are used. Left and right drive wheels 64 are located opposite to each other and can be used to drive pallets. In this embodiment, the drive wheels 64 pivot upwardly through holes 210 in a table 212 in order to contact the pallets directly and move the pallets along the conveyor path defined by the table 212. The support boxes 26, housing supports 30, housings 38, and drive gear and driven gear arrangement are identical in this embodiment to the first embodiment. The basic difference is that there are no rollers 14, so the drive tires 64 contact the product directly.

It will be obvious to those skilled in the art that modifications may be made to the embodiments described above without departing from the scope of the present invention.

What is claimed is:

1. A conveyor, comprising:
   a conveyor frame;
   a plurality of conveyor rollers mounted on said conveyor frame;
   a drive shaft extending along said conveyor frame;
   at least one drive wheel rotatable about its axis, said drive wheel being driven from said drive shaft;
   a drive wheel mounting frame on which is mounted said drive wheel, said drive wheel mounting frame being movable relative to said conveyor frame, such that, when said mounting frame is moved to a first position, said drive wheel is in driving contact with at least one of said conveyor rollers, and, when said mounting frame is moved to a second position, said drive wheel is out of driving contact with said at least one of said conveyor rollers.

2. A conveyor as recited in claim 1, wherein said drive wheel is continuously driven from said drive shaft, such that, whenever said drive shaft rotates, said drive wheel rotates, regardless of whether said drive wheel is in contact with said at least one of said rollers or whether said drive wheel is moved out of contact with said at least one of said rollers.

3. A conveyor as recited in claim 1, wherein said drive wheel mounting frame pivots in order to move said drive wheel into and out of driving contact.

4. A conveyor as recited in claim 1, and further comprising:
   a drive gear mounted on said drive shaft; and
   a driven gear which drives said drive wheel, said driven gear being mounted on said drive wheel mounting frame and meshed with said gear, such that, when said drive wheel mounting frame pivots said drive wheel into and out of contact with its respective roller, said drive gear and driven gear remain continuously meshed.

5. A conveyor as recited in claim 4, wherein said driven gear and said drive wheel are mounted for rotation about the same axis, such that, whenever said driven gear rotates, it causes said drive wheel to rotate.

6. A conveyor as recited in claim 3, wherein said drive wheel mounting frame is mounted so as to pivot about the axis of said drive shaft.

7. A conveyor as recited in claim 6, wherein said drive wheel mounting frame is pivotably supported by a bracket mounted to said conveyor frame.

8. A conveyor as recited in claim 7, and further comprising:
   a drive gear mounted on said drive shaft; and
   a driven gear which drives said drive wheel, said driven gear being mounted on said drive wheel mounting frame and meshed with said drive gear, such that, when said drive wheel mounting frame pivots said drive wheel into and out of contact with its respective roller, said drive gear and driven gear remain continuously meshed.

9. A conveyor, comprising:
   a conveyor frame;
   a drive shaft extending along said conveyor frame;
   at least one drive wheel rotatable about an axis which is substantially perpendicular to the axis of the drive shaft, said drive wheel being driven from said drive shaft;
   a drive wheel mounting frame on which is mounted said drive wheel, said drive wheel mounting frame being movable relative to said conveyor frame, such that, when said mounting frame is moved upward, said drive wheel is in driving position, and, when said mounting frame is moved downward, said drive wheel is out of driving position.

10. A conveyor as recited in claim 9, wherein said mounting frame pivots relative to said conveyor frame.

11. A conveyor as recited in claim 10, wherein said mounting frame pivots about the axis of said drive shaft.

12. A conveyor as recited in claim 9, and further comprising:
   a drive gear mounted on said drive shaft; and
   a driven gear which drives said drive wheel, said driven gear being mounted on said drive wheel mounting frame and continuously meshed with said drive gear.

13. A conveyor as recited in claim 12, wherein said drive wheel is mounted coaxially with said driven gear such that, when said driven gear rotates it causes said drive wheel to rotate.

14. A conveyor as recited in claim 9, and further comprising a plurality of conveyor rollers mounted on said conveyor frame, wherein, when said mounting frame moves upward, said drive wheel is in driving contact with at least one of said conveyor rollers.

15. A conveyor, comprising:
   a conveyor frame;
   a drive shaft extending along said conveyor frame;
   at least one drive gear mounted on said drive shaft for rotation with said drive shaft;
   a bracket mounted on said conveyor frame;

a drive wheel mounting frame pivotably supported from said bracket so as to pivot about the axis of said drive shaft;

a drive wheel and driven gear mounted on said drive wheel mounting frame such that, when said driven gear rotates, said drive wheel rotates, said driven gear being continuously meshed with said drive gear, such that, whenever said drive shaft rotates, it drives said drive gear, which drives said driven gear, which drives said drive wheel, and, such that, when said drive wheel mounting frame is pivoted to one position, said drive wheel is in driving position, and, when said drive wheel mounting frame is pivoted to a second position, said drive wheel is out of driving position.

16. A conveyor as recited in claim 15, and further comprising:

an actuator for causing said drive wheel mounting bracket to pivot.

17. In a conveyor, comprising:

a conveyor frame a drive shaft extending along said conveyor frame; a plurality of rollers mounted on said conveyor frame; and means for driving said rollers from said drive shaft; characterized in that said means for driving said rollers includes:

a drive wheel mounted as to be pivotable about the axis of said drive shaft, such in one position, said drive wheel is in driving engagement with at least one of said rollers, and, in another position said drive wheel is out of driving engagement with said and at least one of said rollers, said drive wheel being driven from said drive shaft.

18. In a conveyor as recited in claim 17, and further comprising:

a drive gear mounted on said drive shaft; and a driven gear mounted coaxially with said drive wheel so as to drive said drive wheel, said drive gear and driven gear being meshed with each other.

19. In a conveyor as recited in claim 18, and further comprising a bracket mounted on said conveyor frame and a drive wheel mounting frame pivotably supported on said bracket, said drive wheel and said driven gear being mounted on said drive wheel mounting frame.

20. In a conveyor as recited in claim 19, and further comprising:

an actuator for causing said drive wheel mounting frame to pivot about the axis of said drive shaft.

21. In a conveyor as recited in claim 19, and further comprising a drive wheel mounting frame support, which holds said drive wheel mounting frame in the position in which said drive wheel is in driving contact with said at least one of said rollers.

* * * * *

UNITED STATES PATENT AND TRADEMARK OFFICE
CERTIFICATE OF CORRECTION

PATENT NO. : 5,287,956

DATED : February 22, 1994

INVENTOR(S) : Collins, et al.

It is certified that error appears in the above-identified patent and that said Letters Patent is hereby corrected as shown below:

Column 2, line 68
"bad,," should read --back--.

Column 3, line 29
insert --is-- after "support 30".

Column 3, line 58
"33" should read --38--.

Column 4, line 2
"rove" should read --move--.

Column 10, line 1
insert --so-- after "mounted".

Column 10, line 2
insert --that,-- after "such".

Column 10, line 4
insert --,-- after "position".

Column 10, line 6
delete "and".

Signed and Sealed this

Nineteenth Day of July, 1994

Attest:

BRUCE LEHMAN

*Attesting Officer*     *Commissioner of Patents and Trademarks*

REEXAMINATION CERTIFICATE (2862nd)

United States Patent [19]
Collins et al.

[11] B1 5,287,956
[45] Certificate Issued Apr. 30, 1996

[54] HIGH SPEED CONVEYOR WITH MOVABLE WHEEL

[75] Inventors: Ellsworth H. Collins, Mt. Washington; James F. Mattingly; William A. Fultz, both of Louisville, all of Ky.

[73] Assignee: Interlake Companies, Shepherdsville, Ky.

Reexamination Request:
No. 90/003,810, Apr. 26, 1995

Reexamination Certificate for:
Patent No.: 5,287,956
Issued: Feb. 22, 1994
Appl. No.: 14,378
Filed: Feb. 5, 1993

Certificate of Correction issued Jul. 19, 1994.

[51] Int. Cl.⁶ ..................................................... B65G 13/06
[52] U.S. Cl. .............. 198/781.04; 198/791; 198/781.06; 198/781.08
[58] Field of Search .................. 198/781.01, 781.02, 198/781.04–781.08, 789, 791

[56] References Cited

U.S. PATENT DOCUMENTS

| | | | |
|---|---|---|---|
| 4,103,769 | 8/1978 | Jorgensen | 198/781.04 |
| 4,109,783 | 8/1978 | Vogt | 198/781.08 |
| 4,164,998 | 8/1979 | DeGood et al. | 198/781 |
| 4,193,492 | 3/1980 | Hammond | 198/781 |
| 4,344,527 | 8/1982 | Vogt et al. | 198/281.04 |
| 4,473,149 | 9/1984 | Vogt et al. | 198/781.04 |
| 4,572,358 | 2/1986 | Swain | 198/781.04 |
| 4,753,339 | 6/1988 | Vogt et al. | 198/781.04 |
| 4,815,588 | 3/1989 | Katsuragi et al. | 198/781.04 |
| 4,960,202 | 10/1990 | Rice et al. | 198/781.02 |
| 5,038,922 | 8/1991 | Collins et al. | 198/781.04 |

*Primary Examiner*—Joseph E. Valenza

[57] ABSTRACT

A conveyor has a drive wheel which is driven from a driveshaft and which moves into and out of driving engagement. In the preferred embodiment, there is a drive gear mounted on the drive shaft, and the drive gear drives a drive wheel, which is mounted on a drive wheel mounting frame that pivots about the axis of the drive shaft, so that the drive wheel is constantly driven from the driveshaft and pivots into and out of driving engagement with the conveyor roller.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 11 and 15–21 is confirmed.

Claims 1–5, 9, 10 and 12–14 are cancelled.

Claims 6 is determined to be patentable as amended.

Claims 7 and 8 dependent on an amended claim, are determined to be patentable.

6. A conveyor, *comprising:*

*a conveyor frame;*

*a plurality of conveyor rollers mounted on said conveyor frame;*

*a drive shaft extending along said conveyor frame and having an axis of rotation;*

*at least one drive wheel rotatable about its axis, said drive wheel being driven from said drive shaft;*

*a drive wheel mounting frame on which is mounted said drive wheel,* wherein said drive wheel mounting frame is mounted so as to pivot about the axis of said drive shaft, *such that, when said mounting frame is pivoted to a first position, said drive wheel is in driving contact with at least one of said conveyor rollers, and, when said mounting frame is pivoted to a second position, said drive wheel is out of driving contact with at least said one of said conveyor rollers.*

* * * * *